(12) United States Patent
Wang et al.

(10) Patent No.: US 11,178,595 B2
(45) Date of Patent: Nov. 16, 2021

(54) METHOD AND DEVICE FOR NETWORKING

(71) Applicant: Nokia Technologies Oy, Espoo (FI)

(72) Inventors: Zhi Wang, Shanghai (CN); Yigang Cai, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 1 day.

(21) Appl. No.: 16/346,138

(22) PCT Filed: Nov. 24, 2017

(86) PCT No.: PCT/EP2017/080400
§ 371 (c)(1),
(2) Date: Apr. 30, 2019

(87) PCT Pub. No.: WO2018/104082
PCT Pub. Date: Jun. 14, 2018

(65) Prior Publication Data
US 2020/0053628 A1 Feb. 13, 2020

(30) Foreign Application Priority Data

Dec. 7, 2016 (CN) .......................... 201611117276.3

(51) Int. Cl.
*H04W 28/02* (2009.01)
*H04W 40/34* (2009.01)
*H04W 4/70* (2018.01)
*H04L 12/24* (2006.01)
*H04L 12/707* (2013.01)
(Continued)

(52) U.S. Cl.
CPC ......... *H04W 40/34* (2013.01); *H04L 41/0681* (2013.01); *H04L 45/22* (2013.01); *H04L 67/12* (2013.01); *H04W 4/70* (2018.02); *H04W 8/04* (2013.01); *H04W 40/04* (2013.01)

(58) Field of Classification Search
CPC ......... H04L 12/28; H04L 45/22; H04L 45/24; H04L 45/306; H04L 41/0681; H04L 45/00; H04L 45/308; H04L 67/12; H04L 67/303; H04L 67/327; H04W 40/02; H04W 40/22;
(Continued)

(56) References Cited

U.S. PATENT DOCUMENTS 9,634,936 B2 * 4/2017 Bansal ................. H04L 45/741
2006/0271696 A1 * 11/2006 Chen ....................... H04L 51/04
709/229
(Continued)

FOREIGN PATENT DOCUMENTS

CN 103200147 A 7/2013
CN 103210616 A 7/2013
(Continued)

*Primary Examiner* — Phuc H Tran
(74) *Attorney, Agent, or Firm* — Harrington & Smith

(57) ABSTRACT

Embodiments of the present disclosure provide a method for networking and a corresponding device. The method includes in response to a terminal device accessing network, obtaining configuration information of the terminal device; based on the configuration information, determining a traffic path associated with the terminal device; and configuring an underlying network node of the network based on the traffic path such that the underlying network node routes traffic associated with the terminal device based on the traffic path. A device that can implement the above method is further disclosed.

12 Claims, 4 Drawing Sheets

(51) Int. Cl.
*H04L 29/08* (2006.01)
*H04W 8/04* (2009.01)
*H04W 40/04* (2009.01)

(58) Field of Classification Search
CPC ....... H04W 40/04; H04W 40/34; H04W 4/70; H04W 8/04
See application file for complete search history.

(56) References Cited

U.S. PATENT DOCUMENTS

| | | | |
|---|---|---|---|
| 2007/0082679 A1* | 4/2007 | Kim | H04L 29/06 455/456.1 |
| 2008/0198861 A1* | 8/2008 | Makela | H04L 67/143 370/401 |
| 2014/0211615 A1* | 7/2014 | Murphy | H04L 41/12 370/228 |
| 2015/0063122 A1* | 3/2015 | Chiang | H04L 45/22 370/238 |
| 2015/0109930 A1* | 4/2015 | Duan | H04W 28/10 370/235 |
| 2016/0269467 A1* | 9/2016 | Lee | H04W 12/001 |
| 2017/0142226 A1* | 5/2017 | De Foy | H04L 45/7453 |

FOREIGN PATENT DOCUMENTS

| | | |
|---|---|---|
| CN | 103229462 A | 7/2013 |
| CN | 103873366 A | 6/2014 |
| CN | 105306333 A | 2/2016 |
| CN | 105359469 A | 2/2016 |
| CN | 106170024 A | 11/2016 |
| EP | 2 963 866 A2 | 1/2016 |

\* cited by examiner

METHOD AND DEVICE FOR NETWORKING

Cross Reference to Related Application

This patent application is a U.S. National Stage application of International Patent Application Number PCT/EP2017/080400 filed Nov. 24, 2017, which is hereby incorporated by reference in its entirety, and claims priority to CN 201611117276.3 filed Dec. 7, 2016.

FIELD

Embodiments of the present disclosure generally relate to the field of communication technology, and more specifically, to a method for networking and a corresponding device.

BACKGROUND

The concept of Internet of Things (IoT) imposes a new challenge to networking and internetworking schemes for conventional networks. To realize the concept of Internet of Things, networks require supporting heterogeneity in devices, networking behaviors and underlying protocols. For example, resource-constrained IoT devices or Machine-type Communication (MTC) devices may have problems of mismatches of communication capabilities, such as mismatches of communication protocols, differences in Maximum Transmission Unit (MTU), differences in processing and communication bandwidths, mismatches of security protocols, and so on. Besides, to enable rapid interaction between services and the infrastructure, networks should also support more agile and flexible device communication and device networking.

With regard to the above problems, Software Defined Networking (SDN) can provide flexible and universal programmability. Therefore, SDN has the capability to facilitate faster rolling out of services that can be updated easily based on ever changing requirements of IoT. Furthermore, SDN permits agile and flexible multiple protocol implementations without carrying out expensive and cumbersome hardware upgrades. As such, it is possible to utilize the flexibility and programmability provided by SDN to solve the problem of device networking in IoT implementation.

SUMMARY

On the whole, embodiments of the present disclosure provide a method for networking and a corresponding device.

In a first aspect, embodiments of the present disclosure provide a method for networking, the method comprising: in response to a terminal device accessing network, obtaining configuration information of the terminal device; determining, based on the configuration information, a traffic path associated with the terminal device; and configuring an underlying network node of the network based on the traffic path such that the underlying network node routes traffic associated with the terminal device based on the traffic path.

In a second aspect, embodiments of the present disclosure provide a device for networking, the device comprising at least one processing unit and at least one memory coupled to the at least one processing unit and storing instructions executable by the at least one processing unit, the instructions, when executed by the at least one processing unit, causing the device to: in response to a terminal device accessing network, obtain configuration information of a terminal device; based on the configuration information, determine a traffic path associated with the terminal device; and configure an underlying network node of the network based on traffic path such that the underlying network node routes traffic associated with the terminal device based on the traffic path.

It will be appreciated that, through the below description according to example embodiments of the present disclosure, the flexibility and programmability offered by SDN can solve the problem of networking devices in IoT implementation.

It is to be understood that Summary does not intend to indicate essential or important features of the embodiments of the present disclosure or to limit the scope of the present disclosure. Other features of the present disclosure will be more comprehensible with the following depiction.

BRIEF DESCRIPTION OF THE DRAWINGS

Through the following detailed description with reference to the accompanying drawings, the above and other features, advantages and aspects of embodiments of the present disclosure will become more apparent. Throughout the drawings, the same or similar reference signs refer to the same or similar elements, in which.

Through the drawings, identical or similar reference numbers represent the same or similar elements.

DETAILED DESCRIPTION

Figure 1:
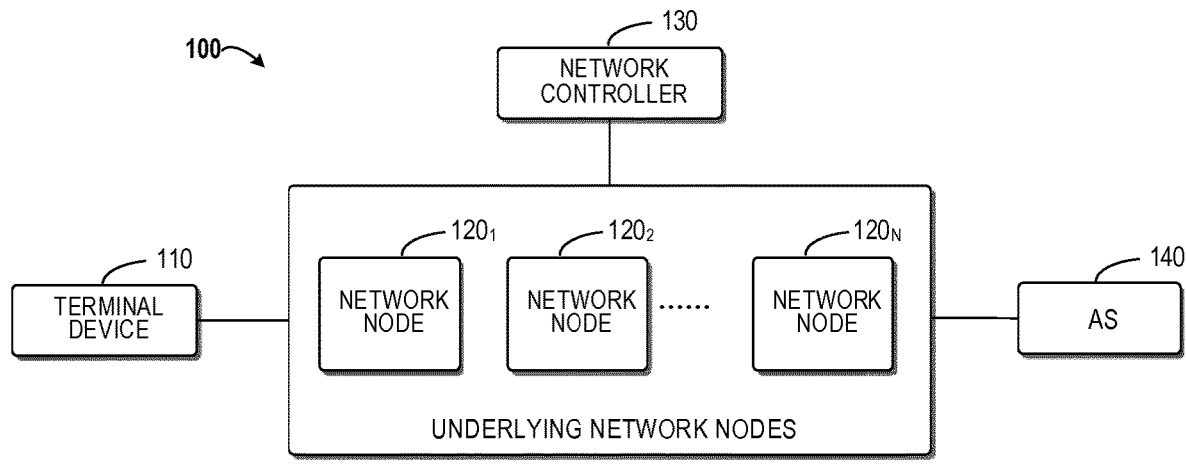
FIG. 1 is an example network architecture in which embodiments of the present disclosure can be implemented.

Embodiments of the present disclosure will be described with reference to the drawings in detail. Though some embodiments of the present disclosure are shown in the drawings, it should be appreciated that the present disclosure can be implemented in various manners and should not be interpreted as limited to the embodiments described herein. Conversely, these embodiments are provided for thorough and complete understanding of the present disclosure. It is to be understood that the drawings and embodiments of the present disclosure are only for illustrative purposes, rather than to limit the scope of protection of present disclosure.

As used herein, the terms "terminal device" or "user equipment (UE)" may comprise various information sensing devices (also called IoT devices), such as radio frequency identifying devices, infrared sensors, global positioning systems, laser scanners and so on. "Terminal device" or "user equipment" (UE) may further comprise any terminal device that can perform wireless communication with base stations or with each other, such as a mobile terminal (MT), a subscriber station (SS), a portable subscriber station (PSS), a mobile station (MS), or an access terminal (AT), the above devices mounted on a vehicle, MTC devices and the like. In the context of the present disclosure, for the sake of convenience, terms "terminal device" and "user equipment" can be used interchangeably.

As used herein, the term "includes" and its variants are to be read as open-ended terms that mean "includes, but is not limited to." The term "based on" is to be read as "based at least in part on." The term "one example embodiment" is to be read as "at least one example embodiment" and the term "another embodiment" represents "at least one another embodiment." The definition of other terms will be given in the following context.

As stated above, IoT devices or MTC devices may have the problem of mismatches of communication capabilities, which imposes a challenge to the implementation of IoT. Networks require supporting heterogeneity in devices, networking behaviors and underlying protocols. Meanwhile, there is also a need to realize more agile and flexible device communication and device networking.

To solve these and other potential problems at least in part, embodiments of the present disclosure provide a method for networking. According to this method, in response to a terminal device accessing network, a network controller obtains configuration information of the terminal device. Based on the configuration information, a traffic path associated with the terminal device can be determined. The traffic path may be utilized to configure underlying network nodes in the network, such that the underlying network nodes may route traffic associated with the terminal device based on the traffic path. In this manner, it is possible to solve the problem of device networking in IoT implementation with the flexibility and programmability offered by SDN.

FIG. 1 is an exemplary network architecture 100 in which embodiments of the present disclosure can be implemented. The network architecture 100 may comprise a terminal device 110, underlying network nodes $120_1$, $120_2$ ... $120_n$ (collectively referred to underlying network nodes 120) and a network controller 130. The network architecture 100 may further comprise entities (also referred to communication partners) for communicating with the terminal device 100, such as another terminal device, an application server (AS) and/or an Application Programming Interface (API). For the purpose of illustration and for ease of depiction, the communication partner of terminal device 110 is shown as an application server 140. It shall be appreciated that the type and number of devices and/or elements illustrated in FIG. 1 are only for illustrative, rather than limiting purposes. The network architecture 100 generally may comprise devices such as a gateway which are not illustrated in FIG. 1 (and FIGS. 4 and 5 below) for the purpose of simplification.

The underlying network nodes 120 are also referred to infrastructure network nodes or service entities which can communicate with the network controller 130 via a standard interface (for example, OpenFlow protocol) and are configured to implement specific operations of protocol conversion, data processing, traffic forwarding, device state collection and so on. For example, the underlying network nodes 120 may comprise a buffer server, a switch, a firewall and so on. It shall be appreciated that each underlying network node may comprise one or more hardware devices. The present disclosure is not limited in this aspect.

A network controller 130, which centrally manages all the devices in the network architecture 100, may configure network resources flexibly and dynamically based on different requirements and global network topology. For example, the network controller 130 may acquire configuration information of the terminal device 110 and the application server 140 from the associated server or database (not shown in FIG. 1), and determine traffic path (such as create necessary forwarding table entries) between the terminal device 110 and the application server 140 based on this configuration information. On the other hand, the network controller 130 may configure underlying network nodes 120 (for example, send down the forwarding table to the underlying network nodes 120) so that the underlying network nodes 120 can route traffic between the terminal device 110 and the application server 140 based on the determined traffic path.

It shall be appreciated that the communication between devices in the network architecture 100 may be implemented based on any proper communication protocol, including but not limited to, first-generation (1G), second-generation (2G), third-generation (3G), fourth-generation (4G) and fifth-generation (5G) cellular communication protocols, wireless local network communication protocols such as Institute for Electrical and Electronics Engineers (IEEE) 802.11 and/or any other protocols currently known or to be developed in the future. Besides, the communication may utilize any proper wireless communication technology, including but not limited to: Code Divided Multiple Access (CDMA), Frequency Divided Multiple Access (FDMA), Time Divided Multiple Access (TDMA), Frequency Divided Duplexer (FDD), Time Divided Duplexer (TDD), Multiple-Input Multiple-Output (MIMO), Orthogonal Frequency-Divided Multiple Access (OFDM) and/or any other technology currently known or to be developed in the future.

Principles and specific embodiments of the present disclosure will be described below in detail with reference to FIGS. 2-4 and from the perspective of the network controller 130. First, referring to FIG. 2, it illustrates a flowchart of a method 200 for networking according to the embodiments of the present disclosure. It shall be appreciated that method 200 may be implemented at the network controller 130 shown in FIG. 1. For ease of depiction, method 200 will be depicted below with reference to FIG. 1.

Figure 2:
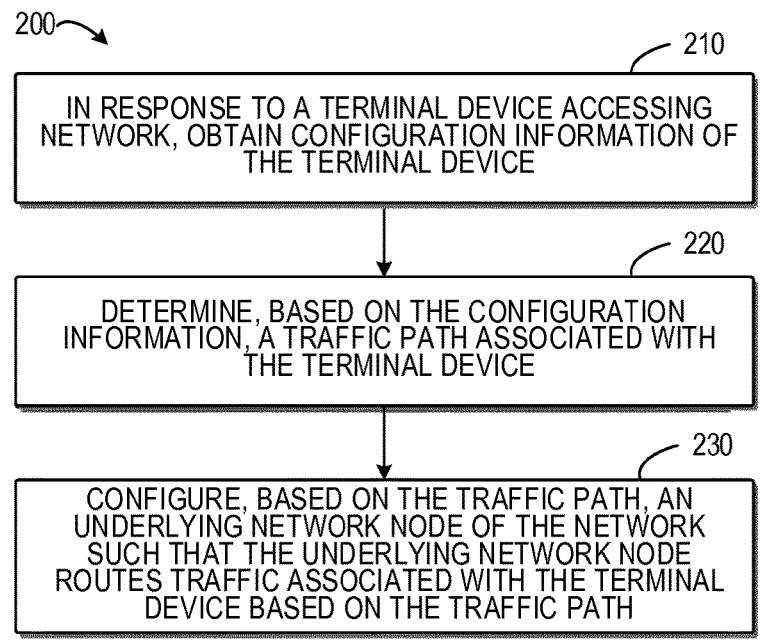
FIG. 2 is a flowchart illustrating a method for networking according to the embodiments of the present disclosure.
Figure 3:
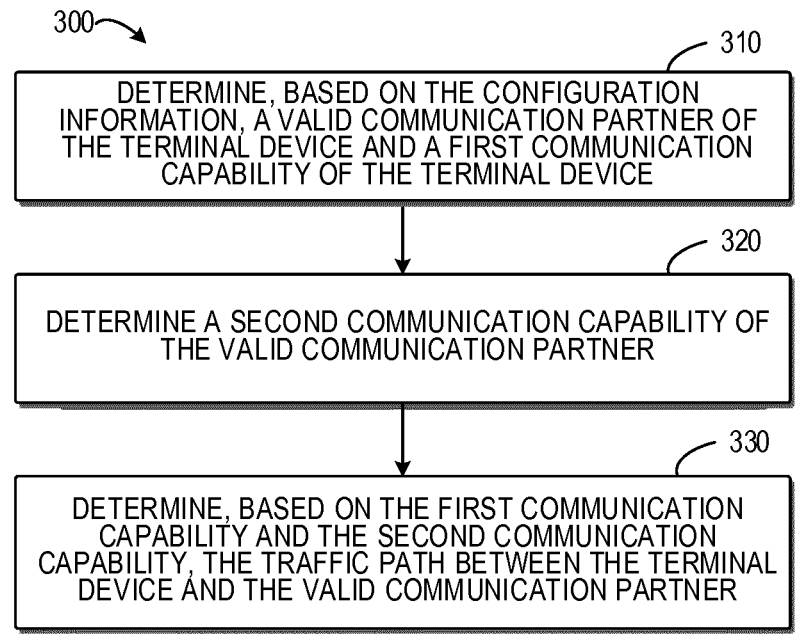
FIG. 3 is a flowchart illustrating a method for determining traffic paths according to the embodiments of the present disclosure.

As shown in FIG. 2, at 210, in response to the terminal device 110 accessing the network, the network controller 130 acquires configuration information of the terminal device 110. In some embodiments, the network controller 130 may obtain subscriber data containing the configuration information from a Home Subscriber Server (HSS).

In some embodiments, the configuration information of the terminal device 110 may comprise information indicating its communication capability, including a list of its supported communication protocols (such as a Constrained Application Protocol (CoAP), Hypertext Transfer Protocol (HTTP)) and/or its supported security protocols (such as Transport Layer Security (TLS) protocol, Datagram Transport Layer Security (DTLS) protocol).

In some embodiments, the configuration information of the terminal device 110 may comprise information indicating its valid communication partners. "Valid communication partners" mentioned here refer to communication partners allowing establishment of connection with the terminal device 110. For example, valid communication partners may comprise AP, API or another terminal device.

In some embodiments, the configuration information of the terminal device 110 may comprise information indicating communication policies, such as a set of service rules. Each service rule is a combination of criterion of network conditions and certain service enabler(s) that should be added to or removed from the traffic path. "The network condition" mentioned here may comprise, but not limited to, time, traffic, state of device, position of device, and attributes of transmitted data (for example, video, audio and so on), and the application that data belongs to (for example, QQ and Wechat). For example, when the terminal device 110 is out of reach, the buffer server is added to the traffic path and when the connection of the terminal device 110 is restored, the buffer server is removed. The service rules enable each traffic path to be updated with the change of network conditions.

In some embodiments, the configuration information of the terminal device 110 may further comprise an address for reporting a communication event associated with the terminal device. For example, when it is determined that no proper traffic paths exist or the network condition changes, the network controller 130 may send a notification toward the address.

At 220, the network controller 130 determines a traffic path associated with the terminal device 110 based on the configuration information. In this aspect, FIG. 3 is a flowchart illustrating a method 300 for determining traffic paths according to the embodiments of the present disclosure. It shall be appreciated that method 300 may be implemented, for instance, at the network controller 130 shown in FIG. 1. For ease of depiction, method 300 will be described below with reference to FIG. 1.

At 310, the network controller 130 determines a valid communication partner of the terminal device 110 and a first communication capability of terminal device 110 based on the acquired configuration information. For example, the network controller 130 may determine that the application server 140 is a valid communication partner of the terminal device 110 and may determine the communication protocols and security protocols supported by the terminal device 110.

At 320, the network controller 130 determines a second communication capability of the valid communication partner. The network controller 130 may also obtain configuration information of this valid communication partner (for instance, the application server 140), such as a list of supported IoT protocols (such as CoAP, HTTP) and/or a list of supported security protocols (such as TLS, DTLS), from HSS or the associated database.

At 330, the network controller 130 may determine the traffic path between the terminal device 110 and the valid communication partner (for instance, the application server 140) based on the first communication capability and the second communication capability. For example, on the basis of matching of communication protocols and security protocols between the terminal device 110 and the application server 140, the network controller 130 may determine the traffic path (for example, create necessary forwarding table entries) between the two, which will be described below in detail with reference to FIG. 4

Returning to FIG. 2, at 230, the network controller 130 configures underlying network nodes 120 based on the determined traffic path so that the underlying network nodes 120 routes traffic associated with the terminal device 110 based on the traffic path. For example, the network controller 130 may send down the created forwarding table to the underlying network nodes 120 for the underlying network nodes 120 to route traffic associated with the terminal device 110 based on the determined traffic path.

Additionally or alternatively, if the configuration information of the terminal device 110 obtained by the network controller 130 comprises communication policies, it means that the traffic path associated with the terminal device 110 is dependent on the network condition. In some embodiments, the network controller 130 may subscribe the related network event report in order to receive network event reports when the network condition changes. The network controller 130 may determine the current network condition based on the network event reports and update the traffic path associated with the terminal device 110 in response to the change of the network condition. For example, the communication policy may indicate adding the buffer server to the traffic path when the terminal device 110 is out of reach and removing the buffer server when a connection with the terminal device 110 is restored. The network controller 130 may determine the traffic path associated with the terminal 110 again based on the communication policy, and reconfigure underlying network nodes 120 based on the re-determined traffic path. The steps of re-determining the traffic path associated with the terminal device 110 and reconfiguring the underlying network nodes 120 are the same as steps 210-steps 230 of the above method 200, thus they are omitted here. A more detailed depiction will be given below with reference to FIG. 4.

Additionally or alternatively, the network controller 130 may further determine an address for reporting communication events associated with the terminal device 110 based on the acquired configuration information of the terminal device 110. Upon occurrence of communication events (for example, when it is determined that no proper traffic paths exist or network condition changes), the network controller 130 may send a notification toward the address.

Figure 4:
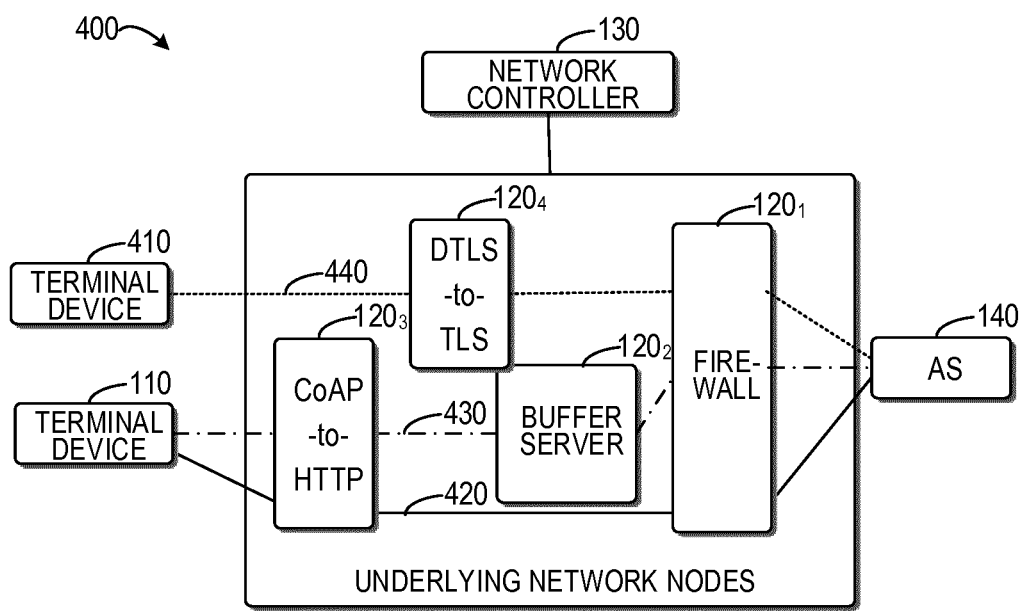
FIG. 4 is an example of networking for terminal devices and valid communication partners thereof according to the embodiments of the present disclosure.

FIG. 4 is an example of networking for terminal devices and their valid communication partners according to the embodiments of the present disclosure. FIG. 4 illustrates a terminal device 110, underlying network nodes 120, a network controller 130 and an application server 140. Particularly, only for illustrative purposes, FIG. 4 shows four underlying network nodes $120_1$, $120_2$, $120_3$ and $120_4$. To be specific, the underlying network node $120_1$ is illustrated as a firewall, the underlying network node $120_2$ is illustrated as a buffer server, the underlying network node $120_3$ is configured to implement mapping from CoAP to HTTP and the underlying network node $120_4$ is configured to implement mapping from DTLS to TLS. Furthermore, FIG. 4 illustrates another terminal device 410 for device networking. Tables 1 to 3 below illustrate configuration information of terminal device 110, application server 140 and terminal device 410, respectively.

TABLE 1

Configuration information of terminal device 110

| Field | Content |
| --- | --- |
| Communication protocol | CoAP |
| Security protocol | No |
| Valid communication partner | Application server 140 |
| Communication policy | Through the firewall in any case; The buffer server is added when the terminal device 110 is out of reach |

TABLE 2

Configuration information of application server 140

| Field | Content |
| --- | --- |
| Communication protocol | HTTP |
| Security protocol | TLS |

TABLE 3

Configuration information of terminal device 410

| Field | Content |
|---|---|
| Communication protocol | HTTP |
| Security protocol | DTLS |
| Valid communication partner | Application server 140 |
| Communication policy | Through the firewall in any case |

When the terminal device 110 accesses the network, the network controller 130 may determine an associated traffic path based on the configuration information of the terminal device 110. As shown in Table 1, the terminal device 110 only supports CoAP, and application server 140 is its valid communication partner. As shown in Table 2, the application server 140 only supports HTTP. Therefore, the network controller 130 may select a path 420 shown in FIG. 4 (namely, through firewall $120_1$ and underlying network node $120_3$) for the connection between the terminal device 110 and the application server 140.

Besides, according to communication policies of terminal device 110, when the terminal device 110 is out of reach, the underlying network node $120_2$ is added to the path. Therefore, when the terminal device 110 is out of reach, the network controller 130 may select a path 430 shown in FIG. 4 (namely, through firewall $120_1$, buffer server $120_2$ and underlying network node $120_3$) for the connection between the terminal device 110 and application server 140.

When the terminal device 410 accesses the network, the network controller 130 determines its associated traffic path based on the configuration information of the terminal device 410. As shown in Tables 2 and 3, the application server 140 is a valid communication partner of the terminal device 410, and both support the same communication protocols but different security protocols. Therefore, the network controller 130 may select a path 440 shown in FIG. 4 (namely, through firewall $120_1$ and underlying network node $120_4$) for the connection between the terminal device 410 and the application server 140.

Figure 5:
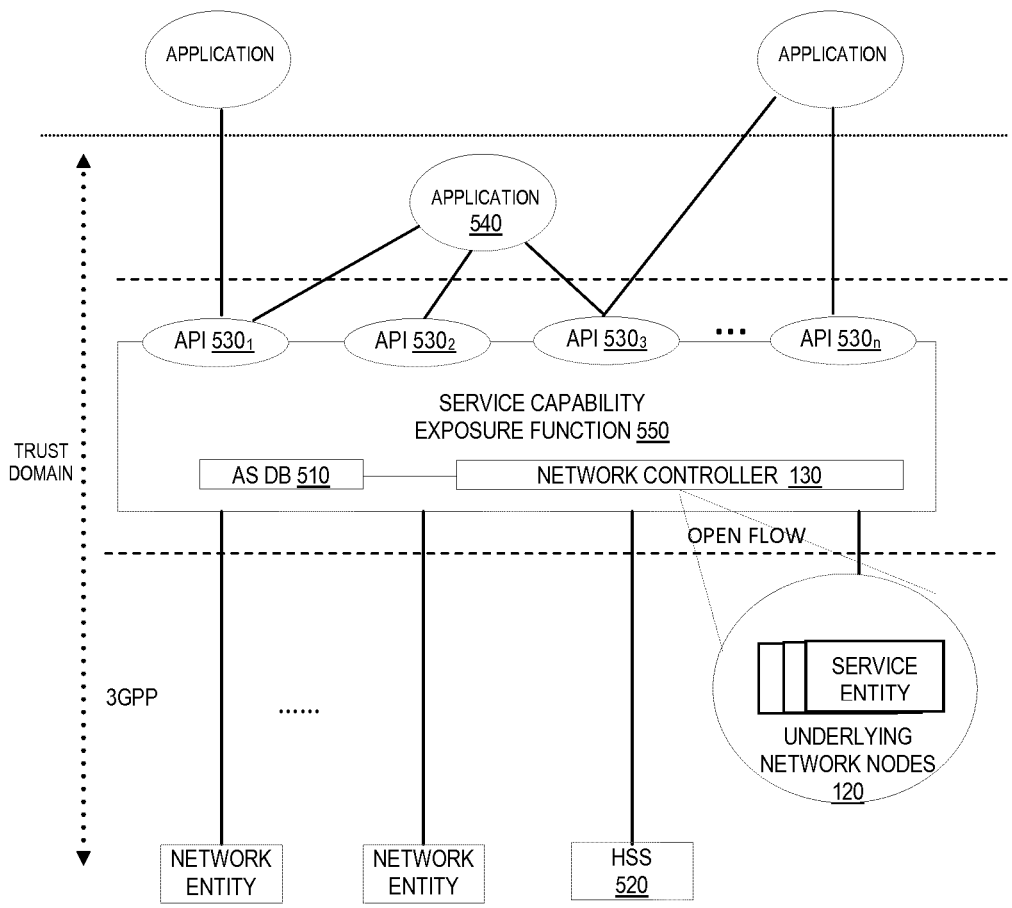
FIG. 5 is an exemplary network architecture in which embodiments of the present disclosure may be implemented.

For the requirements of Iot implementations, the Third-Generation Partnership Project (3GPP) proposes a Service Capability Exposure Function (SCEF) architecture in which communications between the IoT device and the application server may be deemed as occurring between the IoT device and the Northbound API. Embodiments of the present disclosure may be applied in this architecture. In this respect, FIG. 5 illustrates a network architecture 500 in which embodiments of the present disclosure may be implemented. The network architecture 500 may comprise an AS database (DB) 510, an HSS 520, a network controller 130 and underlying network nodes 120, where the network controller 130 is coupled with the AS DB 510 and deployed at SCEF layer 550. The network architecture 500 further comprises API that can communicate with IoT device (not shown in FIG. 5), including API $530_1$, $530_2$, . . . ,$530_n$ (collectively referred to API 530), where the AS DB 510 is used to store configuration information of Northbound API (namely, API 530). The HSS 520 is used to store configuration information of the IoT device as part of subscriber data. It shall be appreciated that the type and number of devices and/or elements shown in FIG. 5 are only for illustrative rather than limiting purpose.

When the IoT device accesses the network, the network controller 130 may download its subscriber data from the HSS 520 to obtain configuration information contained therein. The network controller 130 may determine valid communication partners of the IoT device based on the obtained configuration information, such as API $530_1$ and API $530_2$. The network controller 130 may obtain from the AS DB 510 the configuration information of API $530_1$ and API $530_2$. On the basis of the configuration information of the IoT device and the configuration information of API $530_1$ and API $530_2$, the network controller 130 may determine the traffic path between the IoT device and API $530_1$ and API $530_2$. Furthermore, the network controller 130 may configure underlying network nodes 120 based on the determined traffic path so that the traffic between the IoT device and API $530_1$ and API $530_2$ is routed along the determined traffic path. Thus, the scheme for networking according to the embodiments of the present disclosure may be applied to SCEF architecture to solve the networking problem between devices and applications (such as API) in IoT.

In the example shown in FIG. 5, the IoT device and Northbound API (such as API $530_1$) may have the problem of mismatches of communication capabilities. For instance, both the IoT device and API $530_2$ support CoAP while API $530_1$ only supports a Session Initiating Protocol (SIP). However, it is possible that underlying network nodes for implementing mapping from SIP to CoAP do not exist in the network. Thus, the network does not have a traffic path from the IoT device to API $530_1$. Under this circumstances, when the application 540 shown in FIG. 5 initiates an MTC request to the IoT device through API $530_1$, the network controller 130 may receive from underlying network nodes 120 an event report of a mismatch of communication capabilities. The network controller 130 initiates an IoT capability negotiation to application 540 through API $530_1$, and incorporates the list of APIs of available traffic paths between the IoT devices (such as API $530_2$) in a message of IoT capability negotiation. As application 540 can access API $530_2$, it can initiate an MTC request to the IoT device through API $530_2$.

Figure 6:
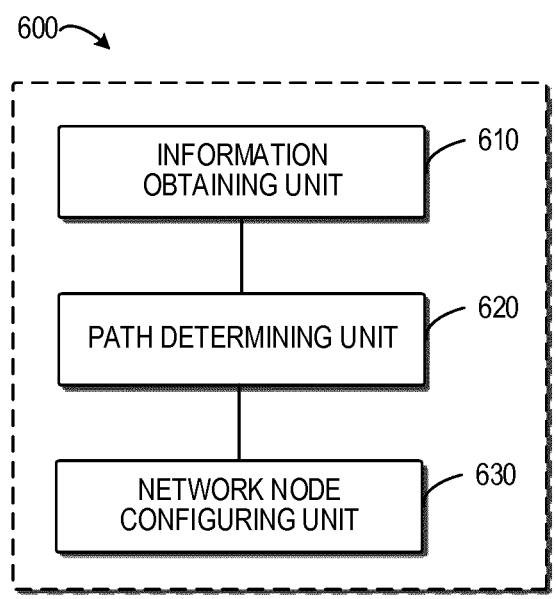
FIG. 6 is a block diagram of an apparatus according to the embodiments of the present disclosure.

FIG. 6 is a block diagram illustrating an apparatus 600 according to the embodiments of the present disclosure. It shall be appreciated that apparatus 600 may be implemented as the network controller 130 shown in FIG. 1, FIG. 4 and/or FIG. 5. As shown in FIG. 6, the apparatus 600 (for instance, the network controller 130) comprises: an information obtaining unit 610 configured to obtain configuration information of a terminal device in response to the terminal device accessing the network; a path determining unit 620 configured to determine a traffic path associated with the terminal device based on the configuration information; and a network node configuring unit 630 arranged to configure underlying network nodes of the network based on the traffic path for the underlying network nodes to enable the underlying network nodes to route traffic associated with the terminal device based on the traffic path.

In some embodiments, the information obtaining unit 610 is configured to obtain subscriber data containing configuration information from a home subscriber server.

In some embodiments, the path determining unit 620 is configured to determine a valid communication partner of a terminal device and a first communication capability of the terminal device based on the configuration information; and determine a traffic path between the terminal device and the valid communication partner based on the first communication capability.

In some embodiments, the path determining unit 620 is further configured to determine a second communication capability of the valid communication partner; and based on the first communication capability and the second communication capability, determine a traffic path between the terminal device and the valid communication partner.

In some embodiments, the valid communication partner is selected from an application server, an application programming interface or another terminal device.

In some embodiments, the apparatus 600 further comprises: a network condition determining unit configured to determine network condition of the network; and a path updating unit configured to update the traffic path associated with the terminal device in response to changes in the network condition.

In some embodiments, the apparatus 600 further comprises: an address determining unit configured to determine from the configuration information an address for reporting communication events associated with the terminal device; and an event reporting unit configured to report the communication event to the address in response to an occurrence of a communication event.

It shall be appreciated that each unit recited in apparatus 600 corresponds to each step in method 200 described with reference to FIG. 2. Therefore, the operations and features described above with reference to FIGS. 1 to 5 also apply to apparatus 600 and the units contained therein and they have the same effect. The specific details are not repeated here.

The units contained in apparatus 600 can be implemented in various ways, including software, hardware, firmware or any combination thereof. In an embodiment, one or more units may be implemented with software and/or firmware, for instance, the machine-executable instructions stored on the storage medium. Apart from machine-executable instructions or as an alternative, a part of or all the units in apparatus 600 may be at least partially implemented by one or more hardware logic components. As an example, rather than for limiting purposes, the available example hardware logic components include a Field Programmable Gate Array (FPGA), an Application Specific Integrated Circuit (ASIC), Application Specific Standard Parts (ASSP), a System on Chip (SOC), and a Complex Programmable Logic Device (CPLD) and so on.

Figure 7:
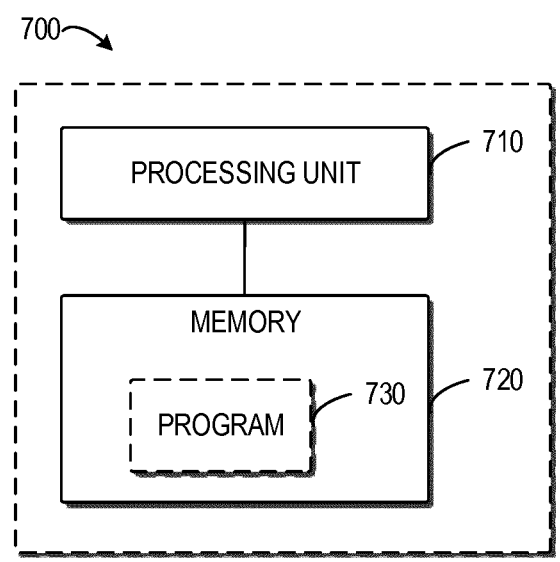
FIG. 7 is a block diagram of a device applicable to implement embodiments of the present disclosure.

FIG. 7 is a block diagram illustrating a device 700 according to some embodiments of the present disclosure. It shall be appreciated that device 700 may be implemented as the network controller 130 shown in FIG. 1, FIG. 4 and/or FIG. 5. As shown in FIG. 7, the device 700 (such as the network controller 130) comprises a processing unit 710 and a memory 720. The memory 720 is coupled to the processing unit 710 and stores computer program instructions 730 executed by the processing unit 710. The computer program instructions 730, when executed by the processing unit 710, cause the device 700 to: in response to the network device accessing network, obtain configuration information of a terminal device; based on the configuration information, determine a traffic path associated with the terminal device; and configure an underlying network node of the network based on the traffic path such that the underlying network node routes traffic associated with the terminal device based on the traffic path.

In some embodiments, the obtaining configuration information of the terminal device comprises obtaining subscriber data comprising configuration information from a home subscriber server.

In some embodiments, the determining a traffic path associated with the terminal device comprises: determining a valid communication partner of the terminal device and a first communication capability of the terminal device based on the configuration information; and determining a traffic path between the terminal device and the valid communication partner based on the first communication capability.

In some embodiments, the determining a traffic path between a terminal device and the valid communication partner comprises: determining a second communication capability of valid communication partners; and determining a traffic path between the terminal device and the valid communication partner based on the first communication capability and the second communication capability.

In some embodiments, the valid communication partner is selected from an application server, an application programming interface or another terminal device.

In some embodiments, the computer program instructions 730, when executed by the processing unit 710, further cause the device 700 to: determine network condition of the network; and in response to changes in network condition, update traffic path associated with the terminal device.

In some embodiments, the computer program instructions 730, when executed by the processing unit 710, further cause the device 700 to: determine from configuration information an address for a communication event associated with the terminal device; and in response to occurrence of the communication event, report the communication event to the address.

Generally, the various exemplary embodiments of the present disclosure may be implemented in hardware or application-specific circuit, software, logic, or in any combination thereof. Some aspects may be implemented in hardware, while the other aspects may be implemented in firmware or software executed by a controller, a microprocessor or other computing devices. When various aspects of the embodiments of the present disclosure are illustrated or described into block diagrams, flow charts, or other graphical representations, it would be understood that the block diagrams, apparatus, system, technique or method described here may be implemented, as non-restrictive examples, in hardware, software, firmware, dedicated circuit or logic, common software or controller or other computing devices, or some combinations thereof.

As an example, the embodiments of the present disclosure may be described in a context of machine-executable instructions which are included, for instance, in the program module executed in the device on a target real or virtual processer. Generally, a program module includes routine, program, bank, object, class, component and data structure, etc. and performs a particular task or implements a particular abstract data structure. In the embodiments, the functions of the program modules can be combined or divided among the described program modules. The machine executable instructions for the program module can be executed locally or in a distributed device. In the distributed device, the program module can be located between the local and remote storage mediums.

The computer program code for implementing the method of the present disclosure may be complied with one or more programming languages. These computer program codes may be provided to a general-purpose computer, a dedicated computer or a processor of other programmable data processing apparatuses, such that when the program codes are executed by the computer or other programmable data processing apparatuses, the functions/operations prescribed in the flow chart and/or block diagram are caused to be implemented. The program code may be executed completely on a computer, partially on a computer, partially on a computer as an independent software packet and partially on a remote computer, or completely on a remote computer or server.

In the context of the present disclosure, the machine-readable medium may be any tangible medium including or storing a program for or about an instruction executing system, apparatus or device. The machine-readable medium may be a machine-readable signal medium or machine-readable storage medium. The machine-readable medium may include, but not limited to, electronic, magnetic, optical, electro-magnetic, infrared, or semiconductor system, apparatus or device, or any appropriate combination thereof. More detailed examples of the machine-readable storage medium include, an electrical connection having one or more wires, a portable computer magnetic disk, hard drive, random-access memory (RAM), read-only memory (ROM), erasable programmable read-only memory (EPROM or flash memory), optical storage device, magnetic storage device, or any appropriate combination thereof.

Besides, although the operations are depicted in a particular sequence, it should not be understood that such operations are completed in a particular sequence as shown or in a successive sequence, or all shown operations are executed so as to achieve a desired result. In some cases, multi-task or parallel-processing would be advantageous. Likewise, although the above discussion includes some specific implementation details, they should not be explained as limiting the scope of any invention or claims, but should be explained as a description for a particular embodiment of a particular invention. In the present invention, some features described in the context of separate embodiments may also be integrated into a single embodiment. On the contrary, various features described in the context of a single embodiment may also be separately implemented in a plurality of embodiments or in any suitable sub-group.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementations of the claims.

We claim:

1. A method, comprising:
in response to a terminal device accessing a network, obtaining from a server information of a configuration of the server that is supported by the terminal device, wherein the information of the configuration of the server comprises a list of at least one of communication protocols or security protocols supported by the terminal device;
identifying, based on the information of the configuration of the server, a valid communication partner associated with the server and a communication capability of the valid communication partner; and
based on the obtained information and the identifying, determining a traffic path associated with a path from the terminal device to the valid communication partner; and
configuring, based on the traffic path, the valid communication partner of the network such that the valid communication partner routes traffic associated with the terminal device towards the server based on the traffic path.

2. The method according to claim 1, wherein the obtaining the information of the configuration of the server that is supported by the terminal device comprises: obtaining, from a home subscriber server, subscriber data comprising the information of the configuration of the server.

3. The method according to claim 1, wherein the valid communication partner is selected from an application server, an application programming interface or another terminal device.

4. The method according to claim 1, further comprising:
determining a network condition of the network; and
in response to a change of the network condition, updating the traffic path associated with the terminal device.

5. The method according to claim 4, further comprising:
based on the change of the network condition, determining, from the information of the configuration of the server, an address for reporting a communication event associated with the terminal device; and
in response to the change of the network condition, reporting the communication event to the address.

6. The method according to claim 1, wherein the information of the configuration of the server that comprises at least the list of Internet of things protocols and security protocols comprises at least one list comprising a constrained application Protocol, a hypertext transfer protocol, and at least one list of security protocols comprising a transport layer security protocol, and a datagram Transport Layer Security protocol.

7. The method according to claim 1, wherein the traffic path is mapping at least one Internet of things protocol and at least one security protocol with the valid communication partner.

8. A device, comprising:
at least one processing unit; and
at least one memory coupled to the at least one processing unit and storing instructions executable by the at least one processing unit, the instructions, when executed by the at least one processing unit, causing the device to:
in response to a terminal device accessing a network, obtain information of a configuration of a server that is supported by the terminal device, wherein the information of the configuration of the server comprises a list of at least one of communication protocols or security protocols supported by the terminal device;
identify, based on the information of the configuration of the server, a valid communication partner associated with the server and a communication capability of the valid communication partner; and
based on the identifying, determine a traffic path associated with a path from the terminal device to the server valid communication partner; and
configure, based on the traffic path, the valid communication partner of the network such that the valid communication partner routes traffic associated with the terminal device towards the server based on the traffic path.

9. The device according to claim 8, wherein the obtaining the information of the configuration of server that is supported by the terminal device comprises: obtaining, from a home subscriber server, subscriber data comprising the information of the configuration of the server.

10. The device according to claim 8, wherein the valid communication partner is selected from an application server, an application programming interface or another terminal device.

11. The device according to claim 8, wherein the instructions, when executed by the at least one processing unit, further cause the device to:
determine a network condition of the network; and in response to a change in the network condition, update the traffic path associated with the terminal device.

12. The device according to claim 11, wherein the instructions, when executed by the at least one processing unit, further cause the device to:
- based on a change of the network condition of the network, determine, from the information of the configuration of the server, an address for reporting a communication event associated with the terminal device; and
- in response to the change of the network condition, report the communication event to the address.

* * * * *